United States Patent [19]
Maeda et al.

[11] Patent Number: 5,784,345
[45] Date of Patent: Jul. 21, 1998

[54] OPTICAL PICKUP DEVICE FOR ELIMINATING UNWANTED DATA

[75] Inventors: Takanori Maeda; Hajime Koyanagi, both of Tsurugashima, Japan

[73] Assignee: Pioneer Electronic Corporation, Tokyo, Japan

[21] Appl. No.: 791,042

[22] Filed: Jan. 28, 1997

Related U.S. Application Data

[62] Division of Ser. No. 364,185, Dec. 27, 1994, Pat. No. 5,633,844.

[30] Foreign Application Priority Data

Dec. 27, 1993 [JP] Japan ............... P5-330652

[51] Int. Cl.$^6$ ............................ G11B 7/095
[52] U.S. Cl. ............... 369/44.23; 369/44.37; 369/112
[58] Field of Search ............. 369/44.23, 44.24, 369/44.37, 109, 112

[56] References Cited

U.S. PATENT DOCUMENTS 4,686,663 8/1987 Kuhn ................. 369/44.37 X
5,361,244 11/1994 Nakamura et al. ......... 369/44.23
5,450,387 9/1995 Ono et al. ............ 369/44.37 X Primary Examiner—W. R. Young
Attorney, Agent, or Firm—Evenson, McKeown, Edwards & Lenahan, PLLC

[57] ABSTRACT

An optical pickup device for writing or reading data from an optical information recording medium has a recording layer whose state changes in response to a density of intensity of an irradiated light beam and a track being used for a tracking servo control system. The device includes a first light spot irradiating element for irradiating a writing or reading light beam onto the recording layer to form a writing or reading spot and a second light spot irradiating element for irradiating at least one controlling light beam onto the recording layer to form a controlling spot having a major axis extending along the track and being longer than a transverse axis perpendicular to the major axis within a level of luminous flux density keeping an original state of the recording layer, whereby a tracking servo control signal having a sufficient level is obtained.

7 Claims, 8 Drawing Sheets

OPTICAL PICKUP DEVICE FOR ELIMINATING UNWANTED DATA

This is a divisional of application Ser. No. 08/364,185, filed Dec. 27, 1994, now U.S. Pat. No. 5,633,844.

BACKGROUND OF THE INVENTION

1. Field of the Invention

The present invention relates to an optical pickup device for use in an optical record/playback apparatus for recording and playbacking data of video and/or sound signals on an optical recording medium such as an optical disk comprising a recording layer with a track structure, more particularly to its tracking servo control of a light beam spot.

2. Description of the Related Art

An optical pickup device for an optical record/playback apparatus generally comprises a light source emitting a light beam, an objective lens for converging the light beam, as a spot on an optical disk or recording medium, a photosensitive detector for producing a signal output corresponding to a data signal recorded on the recording medium on receiving light reflected on the recording medium, and an optical system including a beam-splitter arranged across the light path between the light source and the recording medium for directing the reflected light from the recording medium to the photosensitive detector.

Those components are housed in a pickup enclosure which is movable in relation to the recording medium for the so-called coarse adjustment. For the so-called coarse adjustment of accurate positioning the spot, the components of the optical system are adjusted in relative relationship so that data can be recorded onto and retrieved from a desired recording track of the recording medium.

For realizing a high speed accessing to the target recording track, there is a demand reducing the weight of the optical pickup device. For this purpose, the optical pickup device is divided into a movable unit and a stationary unit, in which the movable unit lighter than the stationary unit is arranged to move in relation to the recording medium for allowing a high speed accessing action. The movable unit carries a minimum number of components including an objective lens and an actuator for moving the objective lens in focusing and tracking directions to direct the light beam towards the desired recording track of the recording medium. The stationary unit incorporates a separate optical system containing a light source, a beam splitter, and a photosensor arranged across the light path. The light beam from the light source is transmitted in parallel from the stationary unit to the movable unit.

There are known various optical recording systems, for example, a phase transition recording system which utilizes the change between crystalline and amorphous of the recording layer of an optical disk upon application of heat; a magneto-optical recording system which utilizes the change of Kerr or Faraday effect of the ferro- or ferrimagnetic recording layer with vertical domains of an optical disk and reverse magnetization upon application of heat and an external magnetic field; and a dye recording system which utilizes the change of photochromic or reflectance of an organic dye recording layer of an optical disk. In these information recording and reproducing systems, pregrooves may be formed on the surface of the substrate carrying the recording layer as tracks with a predetermined track pitch. This pre-groove is used for tracking servo control to cause a light beam spot to trace the pregroove. Recording of data is preformed on or between the pregrooves.

This tracking servo control system for producing a tracking error signal includes the so-called one-beam system using only one light beam for writing or reading data and performing the tracking or the so-called three-beam system using one recording light beam for writing data and two controlling beams for the tracking servo.

In case that an optical information recording medium comprising a recording layer whose state changes in response to a density of intensity of an irradiated light beam, for example, a magneto-optical recording layer is used in the three-beam tracking servo system, two spots of the controlling light beams expand the inverse magnetic domain produced by the irradiation of recording light beam and the external magnetic field during the recording mode, so that the controlling light beams make a problem for recording unwanted data and disturbing the recording of predetermined data to the recording layer of the optical disk.

SUMMARY OF THE INVENTION

The present invention is made to solve such a problem mentioned above and its object is to provide an optical pickup device capable of preventing the controlling light beams from recording unwanted data on the optical disk but producing a tracking error signal having a sufficient level to the tracking servo system.

The present invention of an optical pickup device for writing or reading data from an optical information recording medium having a recording layer whose state changes in response to a density of intensity of an irradiated light beam and a track being used for a tracking servo control system, comprises:

- a first light spot irradiating means for irradiating a writing or reading light beam onto said recording layer to form a writing or reading spot;
- a second light spot irradiating means for irradiating at least one controlling light beam for said tracking servo control system onto said recording layer to form a controlling spot having a major axis extending along the track and being longer than a transverse axis perpendicular to the major axis within a level of luminous flux density keeping an original state of said recording layer;
- an objective lens for directing the reflected lights from the recording medium to an optical detecting means; and
- said optical detecting means for receiving light reflected lights from said controlling spot and said controlling spot on the recording medium.

In the above optical pickup device, said second light spot irradiating means irradiates two controlling light beams. The photodetector comprises two photosensitive surface elements receiving independently said two controlling light beams and is connected to a differential amplifier generating a tracking error signal for controlling a position of said writing or reading light spot on said recording layer in response to a level of difference between outputs from the two photosensitive surface elements.

In the above optical pickup device, said first and second light spot irradiating means own jointly an irregular interval diffraction grating having slits at irregular interval pitches and dividing said writing or reading light beam emitted form a light source into said two controlling light beams.

According to the present invention, the elliptic shaped spots on the recording layer are formed by the controlling light beams in Such a manner that the major axis of the elliptic spot is disposed in substantially parallel to the track extending direction and the luminous flux density within the elliptic spot on the recording layer is controlled at a value less than the minimum luminous flux density at which data are recordable. A sufficient tracking servo control signal can be therefore obtained without changing the characteristics of the recording layer.

DETAILED DESCRIPTION OF THE PREFERRED EMBODIMENT

Preferred embodiments according to the present invention will be described in the form of an optical pickup device of an optical record/playback apparatus referring to the accompanying drawings, but the present invention is not limited by the embodiments.

Figure 1:
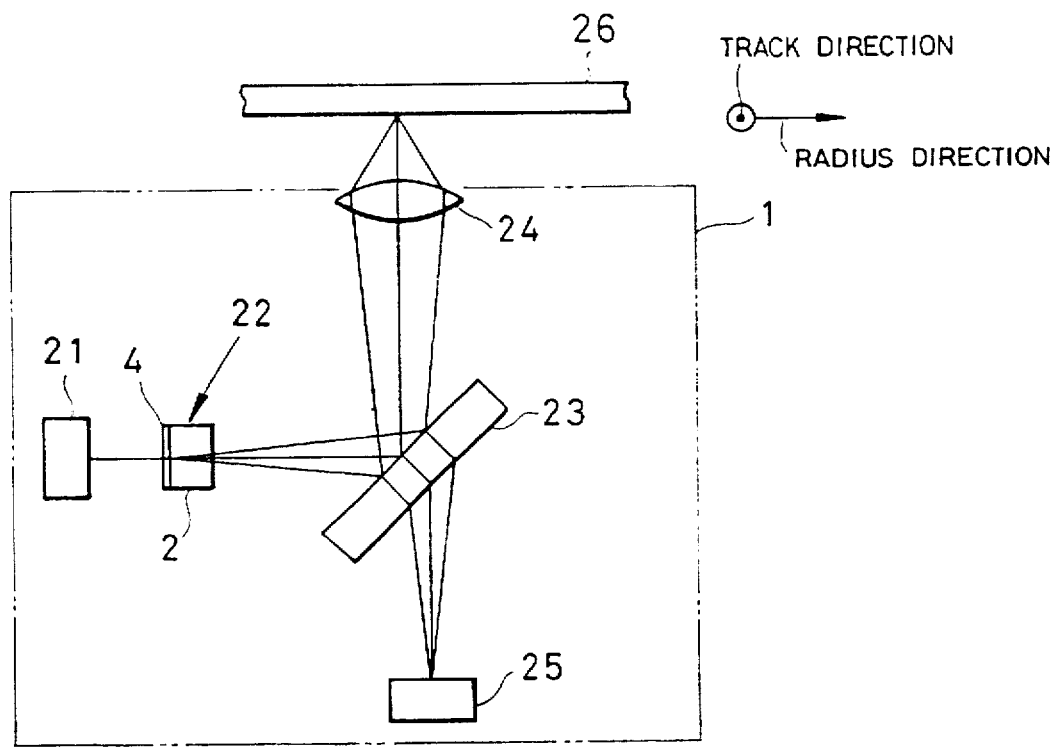
FIG. 1 is a schematic view showing an optical pickup device.

FIG. 1 shows an optical pickup device with a three-beam system. The optical pickup device having a pickup body 1 includes a semiconductor laser 21 of a light source, a diffraction grating element 22 with regular interval pitches, a beamsplitter 23, a movable objective lens 24, and an photodetector 25 receiving light reflected from the spots on an optical disk 26.

The diffraction grating element 22 comprises a hollow cylindrical holder 2 and a grating 4 disposed at the end of the holder. The holder is rotatable in its central axis in such a manner that the diffraction direction of the grating is rotated about the optical axis. The diffraction grating 22 divides a single light beam emitted from a semiconductor laser 21 into three beams of a zeroth order light and two first order lights of plus and minus by its diffraction effect. The three beams are introduced through the beamsplitter 23, an optical system including a ¼ wave plate, a totally reflecting prism, etc., and an objective lens 24 and then irradiated to the recording layer of the optical disk 26. In the pickup body, there is provided an objective-lens-driving mechanism (not shown) including a tracking actuator and a focusing actuator for the movable objective lens. This focusing actuator moves the objective lens 24 in a direction perpendicular to the surface of the recording layer of the optical disk. The tracking actuator of the objective-lens-driving mechanism moves the objective lens 24 in a radius direction of the optical disk.

Figure 2:
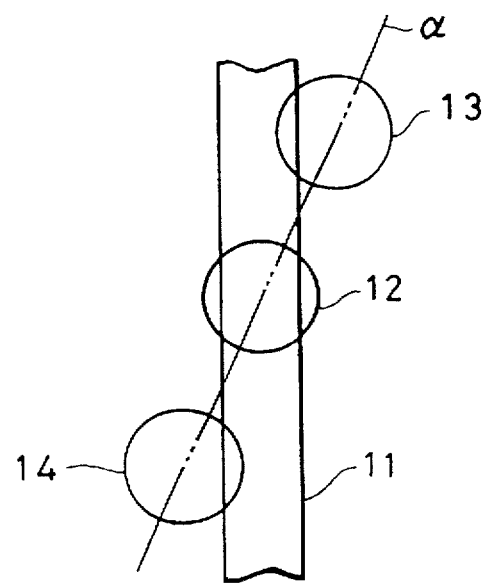
FIG. 2 is a schematic plan view showing light spots irradiated on the optical disk by the optical pickup device shown in FIG. 1.
Figure 3:
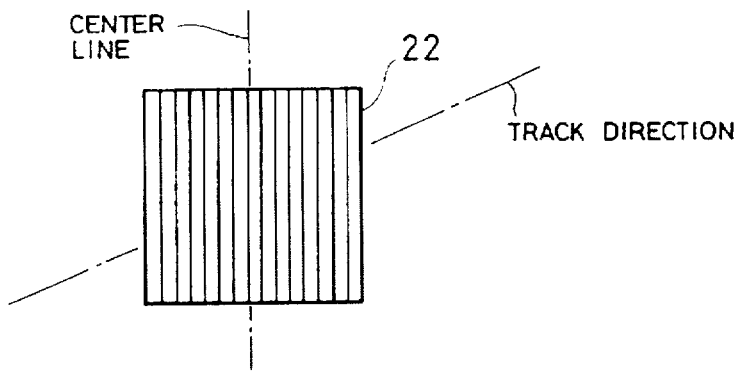
FIG. 3 is a plan view of a regular interval diffraction grating.

This objective-lens-driving mechanism controls the positions of the recording light spot 12 and a pair of the tracking-control light spots 13 and 14 formed on the optical disk shown in FIG. 2 so that the position of the light spots 12 is controlled in the radius direction of the optical disk by the tracking servo system using the light spots 13 and 14. The straight line a passing through the centers of the light spots 12, 13 and 14 makes a predetermined angle with the extending direction of track 11 defined by the direction of each line of grating of the diffraction grating 22, in which the grating line direction is controlled by the rotation of the grating holder 2. FIG. 3 shows a plan view of the diffraction grating 22 seen from the optical axis. By using the diffraction grating 22 having regular interval pitches as shown in FIG. 3, three circular light spots 12, 13 and 14 each having substantially the same shape as shown in FIG. 2 are formed on the optical disk. The light spots are converged nearly up to the diffraction limit respectively. The position of three circular light spots 12, 13 and 14 are set so that, when the recording light spot 12 is positioned at the center of the track, e.g. a pregroove, the controlling light spots 13 and 14 are aligned apart from each other with ¼ track pitches in the radius direction of the optical disk. Reflected lights from the light spot 12, 13 and 14 on the recording layer of the optical disk enter through an objective lens 24 to the beamsplitter 23, and then the beamsplitter 23 deflects the lights to the photodetector 25.

Figure 4:
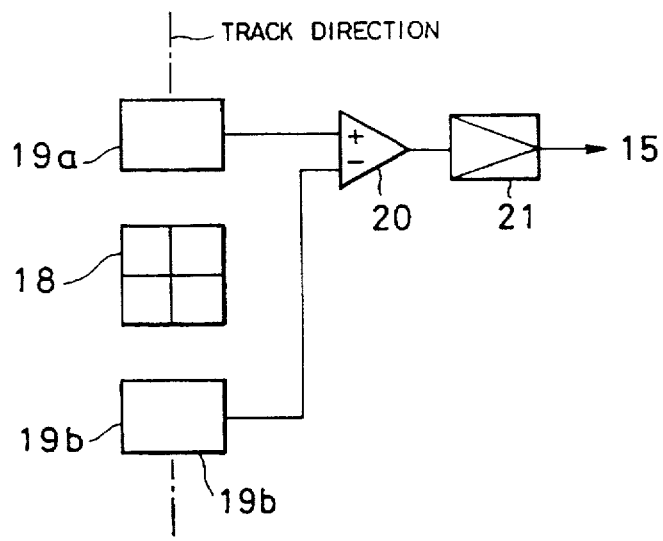
FIG. 4 is a block diagram of the tracking servo control circuit detecting the position of the controlling spots and generating the tracking error signal.

The photodetector 25 includes the so-called four-divided type photo-sensitive portion 18 receiving light reflected from the recording light spot 12 and a pair of photo-sensitive portions 19a and 19b aligned in the track direction and receiving light reflected from the controlling light spots 13 and 14 respectively for the tracking servo control as shown in FIG. 4. The outputs of the four-divided type photosensitive portion 18 are added to each other by adders (not shown) and then transferred to a reading RF signal. The outputs of the photo-sensitive portion 19a and 19b are supplied to a differential amplifier 20, and then the output of the differential amplifier is supplied through an equalizer amplifier 21 to a driving circuit 15 to control an electromagnetic coil (not shown) of the driving mechanism for driving the objective lens. The difference of intensities of reflected lights received from the controlling light spots 13 and 14 is calculated and then, by using the resultant difference signal as a tracking error signal, the objective lens and the positions of three beams are controlled in such a manner that the tracking error signal becomes zero. In this way, the recording light spot 12 is controlled to keep to the center of the pregroove or track.

When this optical pickup device reads data from an optical disk having a recording layer of TbFeCo in a magneto-optical recording system, the recording layer is heated with irradiation of a laser bean above Curie temperature at a recording spot during a recording phase, and at that time the spot portion is polarized by a small external magnetic field e.g., in the opposite direction to the original one whereas, the conditions of heating above Curie temperature depends on a luminous flux density at the recording spot on the recording layer. In other words, the heating conditions are determined by the total power of the irradiated laser beam per spot and the area size of the light spot on the recording layer Since the same size circular controlling and recording light beams are used for light spots in the above optical pickup device, the diffraction efficiency of the grating is therefore set a low level in such a manner that the irradiated controlling light beams do not heat the recording layer to more than Curie temperature. For this purpose, the output of the laser power must be decreased to prevent the controlling light spot from excessively heating the recording layer, so that the level of the tracking error signal generated on the basis of the reflected lights from the controlling light spots is reduced. As a result, a stable tracking servo controlling becomes difficult.

A preferred embodiment according to the present invention overcomes this difficulty. The preferred first embodiment is the same as the optical pickup device shown in FIG. 1 except the regular interval diffraction grating 22. The preferred embodiment of the optical pickup has an irregular interval diffraction grating 52 as shown in FIG. 5 instead of the regular interval diffraction grating 22 as shown in FIG. 1.

Figure 5:
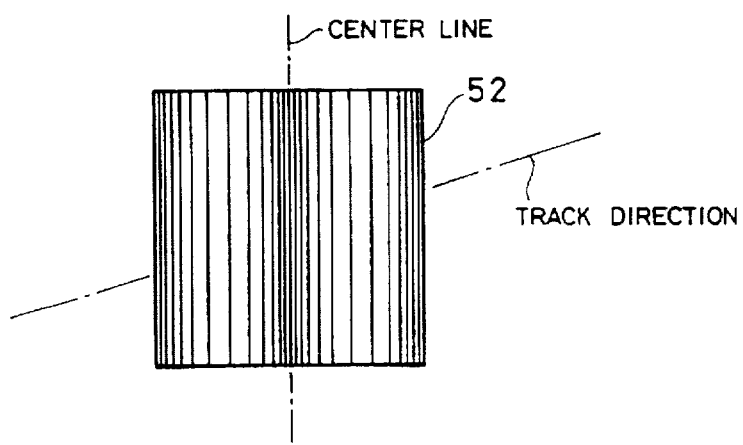
FIG. 5 is a plan view of an irregular interval diffraction grating used in an embodiment according to the present invention.
Figure 6:
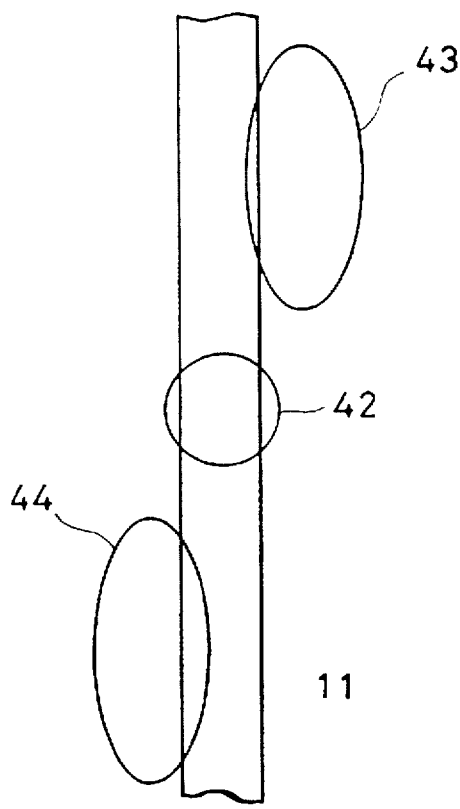
FIG. 6 is a schematic plan view showing irradiated light spots on the optical disk by an embodiment according to the present invention.

FIG. 5 shows a plan view of the irregular interval diffraction grating 52. By using the irregular interval diffraction grating 52, a circular recording light spot 42 and two oval controlling light beam spots 43 and 44 are formed along the track or pregroove 11 as shown in FIG. 6.

Figure 9:
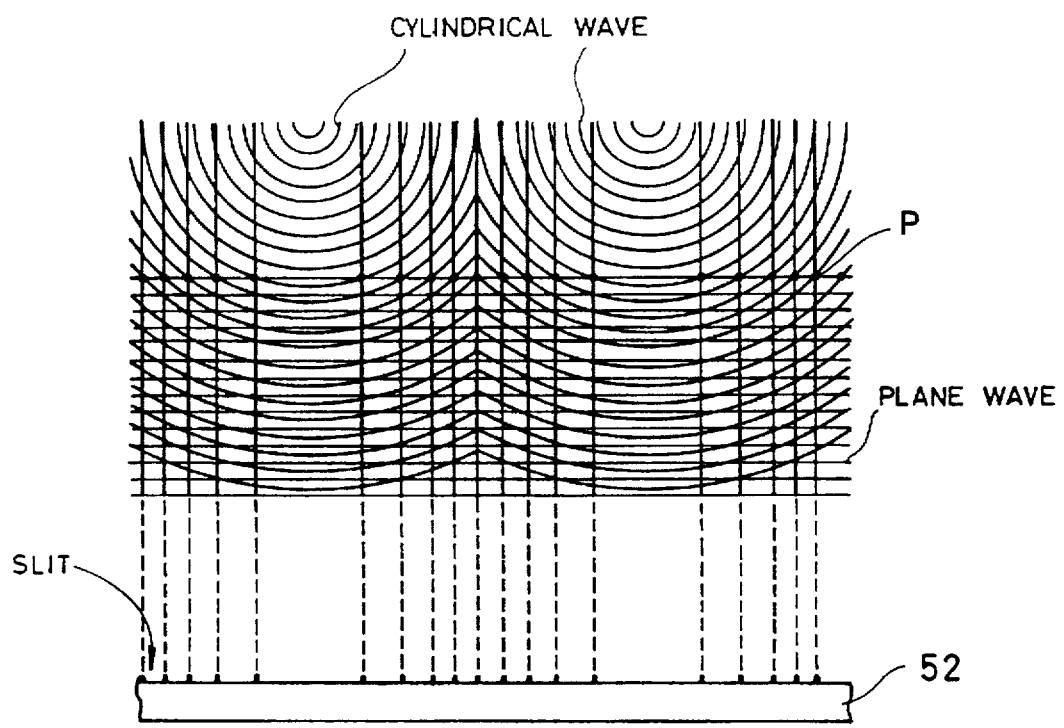
FIG. 9 is a sectional view seen from the center line of the irregular interval diffraction grating used in the embodiment according to the present invention shown in FIG. 5.

The function of the irregular interval diffraction grating 52 will be described in detail. The zeroth order diffracted light passing through the irregular interval diffraction grating 52 is converged on the recording layer up to a diffraction limit as a recording light spot 42. The plus and minus first order diffracted light passing through the irregular interval diffraction grating 52 is expanded on the recording layer as oval controlling light spots 43 and 44 along the track, because the irregular interval diffraction grating 52 shown in FIG. 5 is formed of a large number of extremely narrow different parallel slits separated by different opaque spaces the adjacent pair of which are different width as the slits so that astigmatism occurs to result in elliptic controlling spots 43, 44 appearing on the recording layer. It is preferable that the slit pattern of the irregular interval diffraction grating is symmetrical with respect to a central slit or space thereof. This arrangement of the spots on the recording layer is achieved by the rotation of the irregular interval diffraction grating 52 about the optical axis in such a manner that the major axis of the elliptic spot is disposed substantially parallel to the track of pregroove extending direction. The symmetrical irregular interval diffraction grating is designed on the basis of the Fourier transformation. The shape of irregular interval diffraction grating is generally inverse-Fourier-transformed from the given spot image, because there is a Fourier transform relation between a spot image on the recording layer and a diffraction grating under conditions such as the wavelength of the diffracted light, etc. Briefly, to provide the astigmatic effect to a diffraction grating, a plane wave of laser light is transformed into a cylindrical wave of light. As shown in FIG. 9, assuming that two sources of cylindrical waves are in line and then a plane wave enters perpendicular to the line between two light sources, these waves interfere with each other at the points P. Therefore, when the slits of the grating correspond to the interference points P shown in FIG. 9, the astigmatic effect is obtained by such a grating. In this way, the symmetrical irregular interval diffraction grating is formed on the basis of the pattern p as shown in FIG. 9 by means of a thin film forming method such as a vapor deposition, etc.

Figure 8:
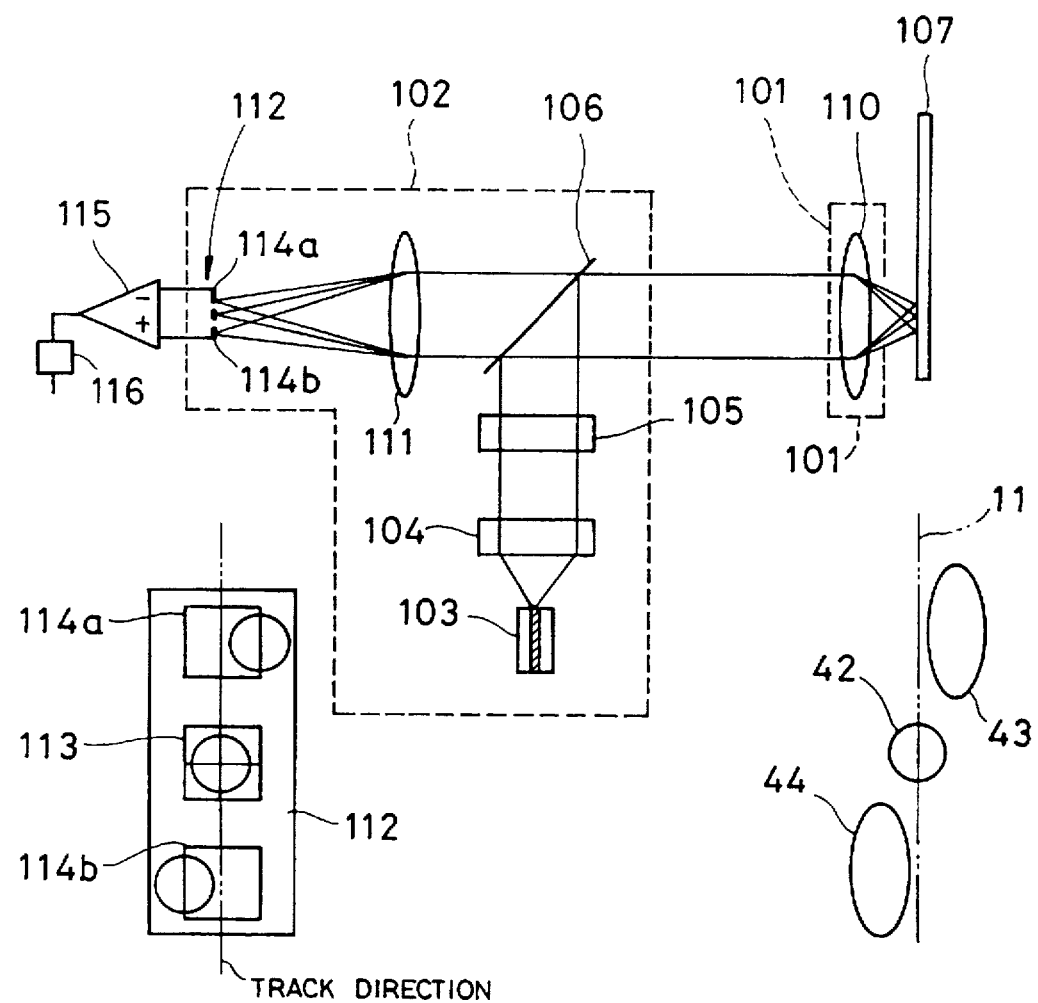
FIG. 8 is a schematic view showing an optical pickup device of another embodiment according to the present invention.
Figure 10:
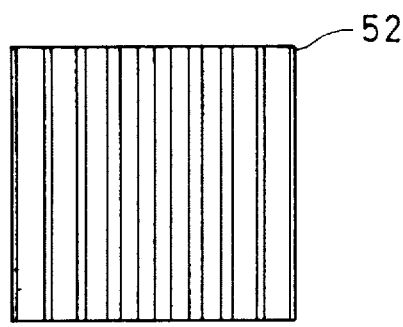
FIG. 10 is a plan view of another irregular interval diffraction grating used in another embodiment according to the present invention.
Figure 11:
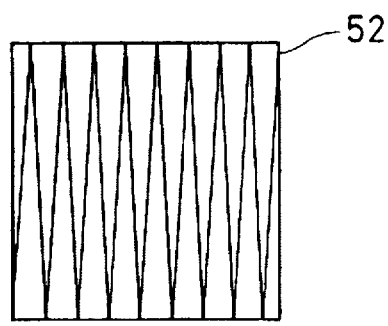
FIG. 11 is a plan view of another irregular interval diffraction grating used in another embodiment according to the present invention.
Figure 12:
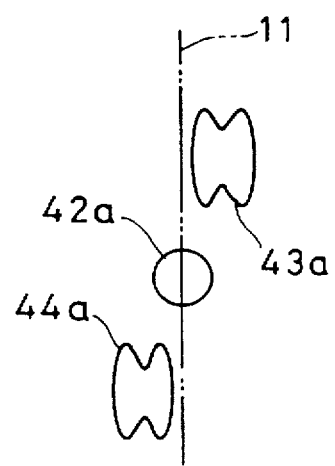
FIG. 12 is a schematic plan view showing irradiated light spots on the optical disk by the embodiment using irregular interval diffraction grating shown in FIG. 11.

In addition, the irregular interval diffraction grating has a slit pattern as shown in FIG. 10 in which a duty ratio of a pitch between adjacent pair of slits changes in an arranged direction thereof, for example, 1:9, 2:8, 3:7 . . . 7:3, 8:2, 9:1 from the lest hand side of the grating. In the embodiment using such a duty ratio changed grating, the spots are formed the same as shown in FIGS. 6 and 8. Furthermore, the irregular interval diffraction grating may have a zigzag slit pattern in which each slit has an acute triangle shape as shown in FIG. 11. In this case, the modified oval spots 43a and 44a are formed both side of a center circular spot 42a along the track 11 as shown in FIG. 12.

On the other hand, a regular diffraction grating consists of a large number of extremely narrow equal parallel slits separated by equal opaque spaces that are usually of the same width as the slits.

The recording light spot 42 is substantially a circle and has a comparatively high luminous flux density during the recording of data.

The controlling light spots 43 and 44 are ellipse-extending in the track extending direction and have a comparatively low luminous flux density on the recording layer so that thermal distribution is expanded and dispersed in the track direction in comparison with that of the recording light spot 42. Since the luminous flux density is very low within the controlling light spots 43 on the recording layer, the rising of temperature of the controlling light spot is suppressed in the recording layer during the rotation of the optical disk, so that the recording of data is achieved-without causing the phase transition.

Figure 7:
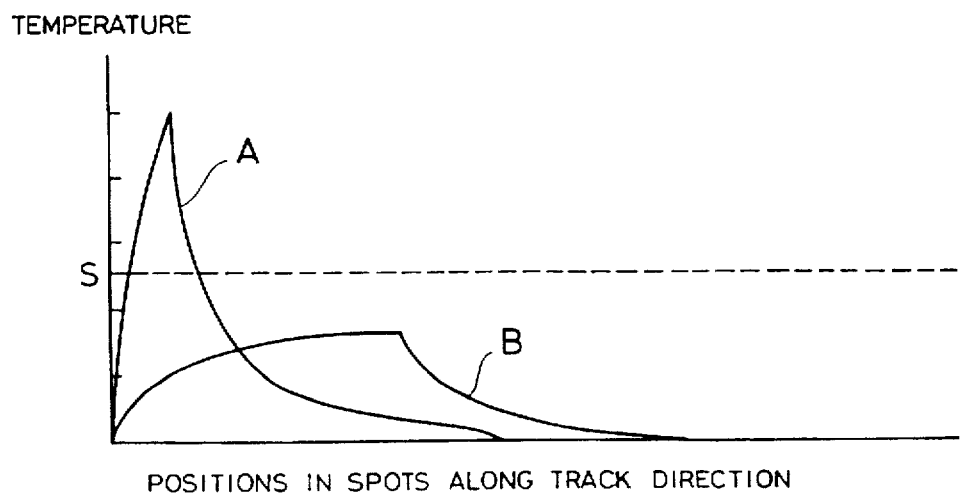
FIG. 7 is a graph showing temperature distributions in both spots irradiated recording and controlling light beams with respect to positions in a track extending direction of a recording layer of an optical disk.

FIG. 7 shows a relation of thermal distributions of the recording light spot 42 and controlling light spots 43 and 44 corresponding to luminous flux densities respectively in the track direction, in which the abscissa axis shows the positions in the spots along the track extending direction, and the vertical axis shows the temperature of the recording layer. In FIG. 7, S in the vertical axis shows a recordable threshold temperature of the recording layer which is predetermined on the basis of the luminous flux density distribution on the recording layer. Curved line A denotes the changing temperature within the recording light spot 42. The diameter of the circular recording light spot 42 is about 1 μm at the output light power of 1 mW so that the distribution of light intensity is steep and has a high peak temperature above the threshold S. Curved line B denotes the changing temperature within each of the oval controlling light beam spots 43 and 44. The shorter and longer diameters of the oval spots are 1 μm and 5 μm respectively at the output light power of 1 mw so that the distribution of light intensity is substantially flat and has a lower peak temperature than the threshold S.

In this way, the status-change of the recording layer in the spots of controlling light beams can be prevented by the setting of the luminous flux density of the spots lower than that of a minimum recordable luminous flux density of the recording layer i.e., the threshold S.

As seen from FIG. 4, a pair of photo-sensitive portions 19a and 19b are aligned in the track direction and receiving light reflected from the controlling light spot 13 and 14 respectively for the tracking servo control. Therefore, the level of the resultant tracking error signal caused by the oval light spot is maintained in comparison with that of caused by the circular light beam, because the output level of the detector is depends on the expanded area in the direction of track pitches i.e., the radius direction in the optical disk and the shorter diameter of the oval spot is kept at the level of the circular controlling spot's diameter.

According to this first embodiment of the three-beam system and optical pickup device, the irregular interval diffraction grating in the irradiating optical system of the pickup device divides a single light beam emitted from the light source into three beams, i.e., a recording light beam for forming a circular writing or reading spot with a high luminous flux density and two controlling light beams for forming two oval side spots on the recording layer with a low luminous flux density respectively, and then the reflected light from the two controlling light beams is received by the photodetectors, so that the tracking servo control is achieved on the basis of the difference between levels the photodetectors.

FIG. 8 illustrates an optical pickup device of a second embodiment which is consisted mainly of a movable unit 101 and a stationary unit 102.

The stationary unit 102 contains a light source 103, e.g. a semiconductor laser and a light transmitting means which comprises a collimator lens 104, an irregular interval grating 105, and a beam splitter 106 arranged in this order along the light path extending from the light source 103. In action, the light beam emitted from the light source 103 is converted by the collimator lens 104 to a parallel beam. This parallel beam is then split by the irregular interval grating 105 to a zeroth order and plus and minus first order diffracted light directed by the beam splitter 106 towards the movable unit 101 as a whole parallel beam flux.

The movable unit 101 contains an objective lens 110 installed opposite to an optical disk 107 of a recording medium. The movable unit 101 is arranged to move radially over the disk 107 along a pickup guide (not shown) which extends in the radial direction of the optical disk 107. The parallel beam flux transmitted from the stationary unit 102 via a space to the movable unit 101 are reflected on an appropriate mirror (not shown) and converged by the objective lens 110 onto the surface of the optical disk 107 so that a circular recording light spot 42 at a center and two oval controlling light beam spots 43 and 44 at both sides are formed along the track or pregroove 11 on the optical disk as shown in FIGS. 6 and 8.

These light beams are reflected by the optical disk 107 and run backward through the objective lens 110 and the space to the stationary unit 102.

The reflected light beam flux pass across the beam splitter 106 to a focusing means or light converging system 111 by which they are converged on a sensing means or photodetector 112.

In this way, the zeroth order and the plus and minus first order lights split by the irregular interval diffraction grating 105 are reflected at the corresponding spots by the optical disk 107 and enter the photodetector 112.

As shown in FIG. 8 the photodetector 112 comprises a center photodiode 113 for sensing the zeroth order diffraction reflected light from the movable unit 101 and side light photodiodes 114a, 114b for sensing positive and negative first order diffraction reflected lights respectively. The three photodiodes 113, 114a, 114b are arranged in a row corresponding to respective focal points in the light converging system 111.

For a focusing servo, an astigmatizer or cylindrical lens (not shown) is usable in the optical path of reflected light between the photodiode 113 and the light converging system 111. The zeroth order diffraction reflected light passing the light converging system 111 may be astigmatically focused by the astigmatizer or cylindrical lens. This conventional astigmatic focusing technique allows a focusing error signal to be produced in out-of-focus.

The photodiodes 114a, 114b are connect to a differential amplifier 115 for detecting the incident location of the plus and minus first order diffraction reflected lights on the photosensitive surfaces of the photodiodes 114a, 114b. The position detector 115 provides a signal to a calculating circuit 116.

The calculating circuit 116 calculates a position signal representing the position of the movable unit 101 along the radial direction of the disk 107 on the basis of the output signals of the position detectors 115a, 115b.

Figure 13:
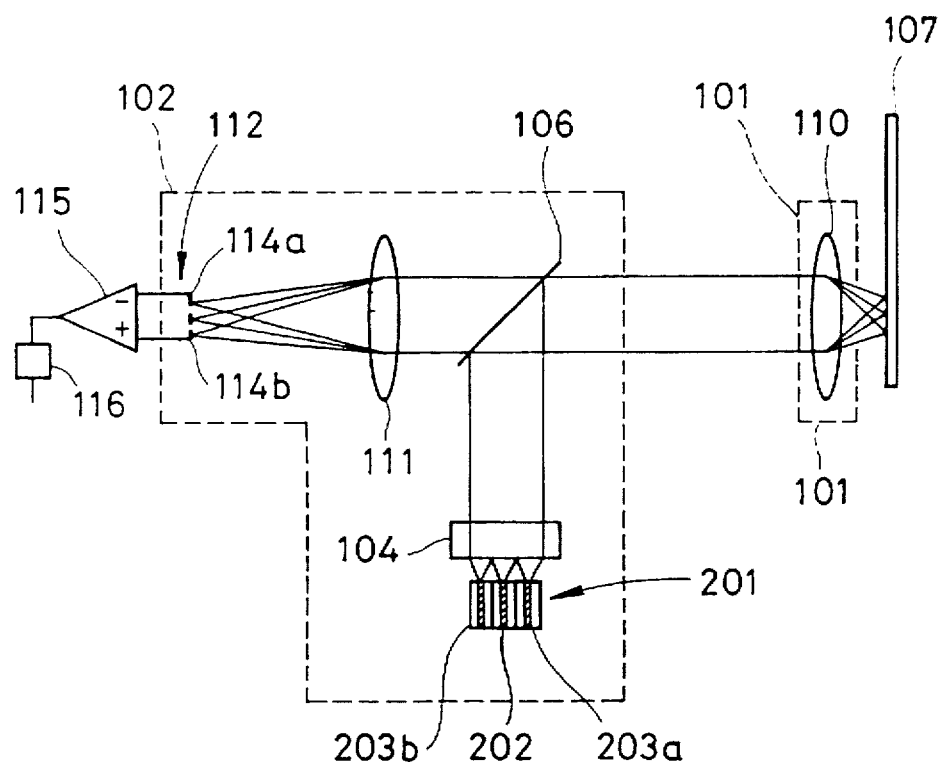
FIG. 13 is a schematic view showing an optical pickup device of another embodiment according to the present invention using three semiconductor laser devices for a light source.
Figure 14:
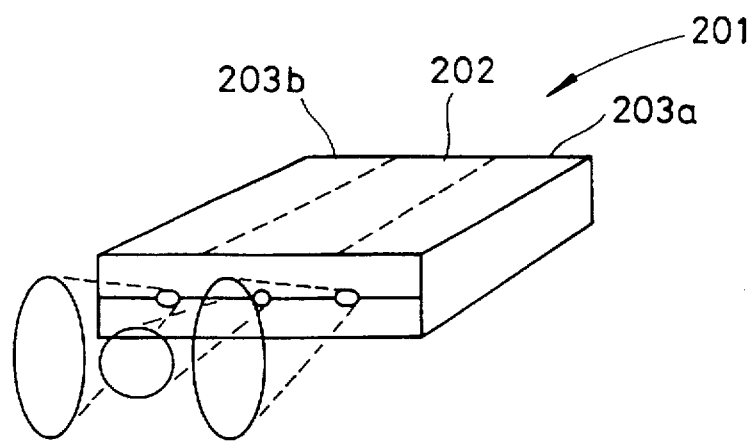
FIG. 14 is a perspective view of an integrated semiconductor laser device for a light source used in another embodiment according to the present invention.

Although the forgoing first and second embodiments have only one light source for emitting a single light beam and an irradiating optical system including the irregular diffraction grating with irregular interval pitches for dividing such a light beam into one recording light beam and two controlling light beams, another embodiment of an optical pickup device of the present invention may have the first and second light spot irradiating means separately generating one recording light beam and two controlling light beams respectively as shown in FIG. 13. This embodiment according to the present invention is the same as the optical pickup device shown in FIG. 8 except a light source 201 comprising a central semiconductor laser 202 emitting a writing or reading light beam, and a pair of side semiconductor lasers 203a, 203b disposed both sides of the central semiconductor laser and emitting controlling light beams respectively without the regular interval diffraction grating 22. This light source 201 may be formed as an integrated semiconductor leaser device combined of a central semiconductor laser 202, and a pair of side semiconductor lasers 203a, 203b as shown in FIG. 14. The central semiconductor laser 202 is of an index guide type structure comprising an active layer having a distribution of refractive index in a transverse direction thereof so as to form a substantially circular far field pattern. The side semiconductor lasers 203a, 203b are of a gain guide type structure comprising an active layer having non-distribution of refractive index in a transverse direction thereof so as to form an oval or astigmatic far field pattern.

Figure 15:
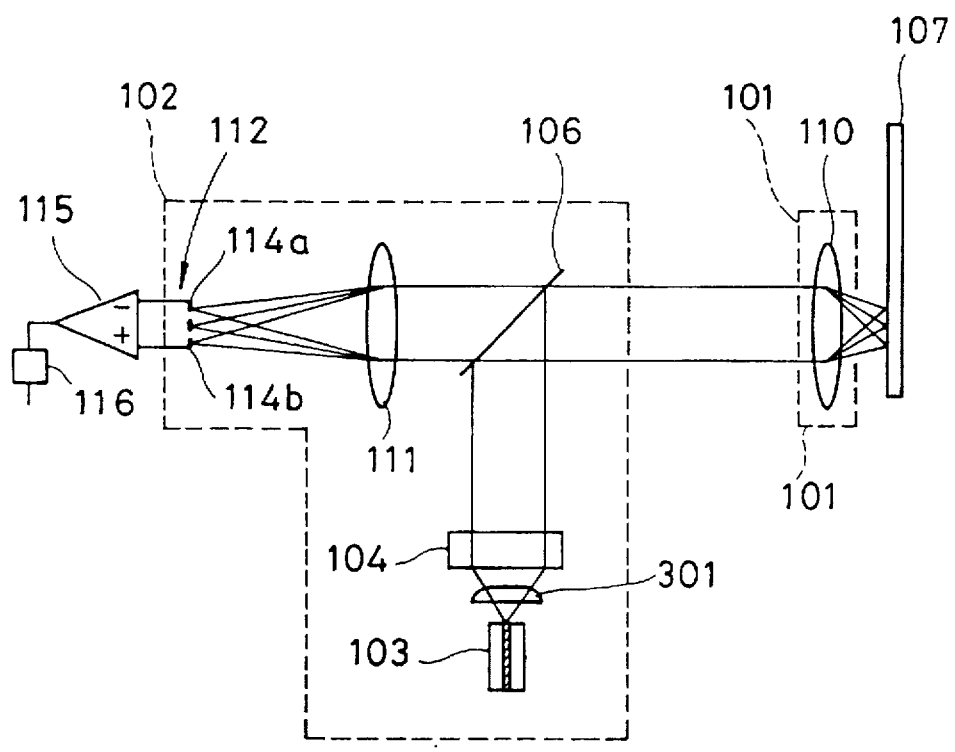
FIG. 15 is a schematic view showing an optical pickup device of another embodiment according to the present invention using a plate prism for dividing a laser beam.
Figure 16:
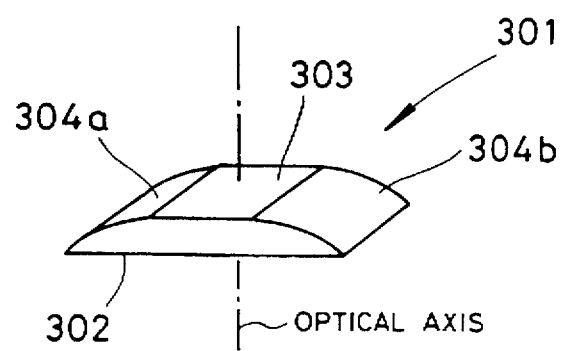
FIG. 16 is a perspective view of the plate prism used in the embodiment shown in FIG. 15.

Furthermore, another embodiment of an optical pickup device of the present invention may have a plate prism 301 as shown in FIG. 15 instead of the grating. This embodiment according to the present invention is the same as the optical pickup device shown in FIG. 8 except the plate prism 301 without the regular interval diffraction grating 22. As shown in FIG. 16, the plate prism 301 has a substantially isosceles trapezoid sectional shape symetrical with respect to an optical axis of the laser beam. The plate prism 301 comprises an incident flat surface 302 and a projecting flat surface 303 both expanding perpendicular to the optical axis of the laser beam; and a pair of cylindrical surfaces 304a, 304b being disposed at both sides of the projecting flat surface 303 on both isosceles portions. Each cylindrical surface extends perpendicular to the optical axis. The plate prism 301 divides the emitted light into the writing or reading light beam and the two controlling light beams.

In the first and second embodiments, the pregroove to be traced by the light beams is previously formed on the optical disk. Another embodiment of an optical pickup device of the present invention may be applied to a playback system using an optical disk without pregroove, e.g., a wobbled mark tracking servo system, in which the light spots trace the marks previously recorded on the recording layer a few of which may be performed with the erasing, overwriting, writing or reading.

Although the forgoing first and second embodiments have the three-beam system for the tracking servo control, another embodiment of an optical pickup device of the present invention may have a push-pull tracking servo system utilizing only one oval controlling light spot and one circular recording light spot in which the reflected light from the oval controlling light spot is detected by two-divided photosensitive surfaces in the track pitches or radius direction of the optical disk so that the difference of outputs of the surfaces is used as a tracking error push-pull signal.

The forgoing first and second embodiments are used in a magneto-optical recording system. Another embodiment of an optical pickup device of the present invention may be applied to other recording systems using an optical information recording medium comprising a recording layer whose state changes in response to a density of intensity of an irradiated light beam, such as a phase transition recording system utilizing a phase transition of its recording layer caused by application of light or heat, an organic dye reflection system utilizing a change of reflectance of its recording layer made of a dye caused by application of light or heat, a hole burning (ablation) system or the like.

In the case that there is not a clear threshold of luminous flux density for changing the state of the recording layer whose state changes in response to a density of intensity of an irradiated light beam, for example, the dye optical disk, the embodiments of the pickup device are used in such a manner that the size of the controlling light beans may be set within less than value of increasing noise in the resultant signal in the reproducing circuit.

The forgoing first and second embodiments have the irradiating optical system using the irregular diffraction grating for giving astigmatism in the controlling light beam for an oval spot. Another embodiment may have an irradiating optical system using an optical element for giving other aberrations such as coma aberration. In addition, another embodiment of an optical pickup device has also a diffraction grating comprising a secondary winding curve with an irregular pitch instead of the irregular diffraction grating above mentioned.

Although the recording medium in the embodiments is a disk of circular shape, it is not limitative and may be a card disk or other appropriate medium for use with any optical comprises a movable unit and a stationary unit for recording and reproducing of data.

What is claimed is:

1. An optical pickup device for writing or reading data from an optical information recording medium, having a recording layer which changes from an original state to another state in response to a density of intensity of an irradiated light beam and a track being used for a tracking servo control system, comprising:

a movable unit carrying an objective lens and arranged for moving in relation to said recording medium; and a stationary unit comprising:

an irregular interval diffraction grating having slits at irregular interval pitches for splitting a laser light emitted from a light source into one zeroth order diffracted beam for writing or reading data and plus and minus first order diffracted light beams for said tracking servo control system, a light transmitting means for transmitting the diffracted light beams along a light path up to said objective lens of the movable unit so as to make said zeroth order diffracted beam form a writing or reading spot having a first luminous flux density on the recording layer and to make said plus and minus first order diffracted light beams form controlling spots which are radially displaced from each other on the recording layer by fractional track pitches, each of said controlling spots having a major axis extending along the track and a minor axis, shorter than said major axis, extending perpendicular to the major axis, each of said controlling spots having a second luminous flux density within a level which does not affect said original state of said recording layer, a light converging means for collecting reflected light from the recording medium, and an optical detecting means, comprising two independent photosensitive surface elements, for receiving said reflected light from said controlling spots.

2. An optical pickup device according to claim 1, wherein said irregular interval diffraction grating is formed of a large number of extremely narrow different parallel slits separated by different opaque spaces, the opaque spaces in adjacent pairs of said opaque spaces having widths which are different from widths of the slits so that astigmatism occurs resulting in elliptic controlling spots appearing on the recording layer.

3. An optical pickup device according to claim 2, wherein said irregular interval diffraction grating has a slit pattern symmetrical with respect to a central slit or space.

4. An optical pickup device according to claim 2, wherein said irregular interval diffraction grating has a slit pattern in which a duty ratio of a pitch between adjacent pairs of slits changes in an arranged direction thereof.

5. An optical pickup device according to claim 2, wherein said irregular interval diffraction grating has a zigzag slit pattern in which each said slit has an acute triangle shape.

6. An optical pickup device for writing or reading data from an optical information recording mediums having a recording layer which changes from an original state to another state in response to a density of intensity of an irradiated light beam and a track being used for a tracking servo control system, comprising:

a movable unit carrying an objective lens and arranged for moving in relation to said recording medium; and a stationary unit comprising:

a light source emitting a laser beam, a plate prism having a substantially isosceles trapezoid sectional shape symmetrical with respect to an optical axis of said laser beam, said plate prism further comprising an incident flat surface and a projecting flat surface both oriented perpendicular to the optical axis of the laser beam and a pair of cylindrical surfaces disposed at opposite sides of said projecting flat surface, each cylindrical surface extending perpendicular to the optical axis, said plate prism dividing emitted light into a writing or reading light beam and two controlling light beams, a light transmitting means for transmitting the diffracted light beams along the light path up to said objective lens of the movable unit so as to make a zeroth order diffracted beam form a writing or reading spot having a first luminous flux density on the recording layer and to make plus and minus first order diffracted light beams form controlling spots which are radially displaced from each other on the recording layer by fractional track pitches, each of said controlling spots having a major axis extending along the track and a minor axis, shorter than said major axis, extending perpendicular to the major axis, each of said controlling spots having a second luminous flux density within a level which does not affect said original state of said recording layer, a light converging means for collecting reflected light from the recording medium, and an optical detecting means, comprising two independent photosensitive surface elements, for receiving reflected light from said two controlling spots.

7. An optical pickup device according to claim 6, wherein said two photosensitive surface elements are connected to a differential amplifier generating a tracking error signal for controlling a position of said writing or reading light spot on said recording layer in response to a level of difference between outputs from the two photosensitive surface elements.

* * * * *